United States Patent
Hwang

[11] Patent Number: 5,812,348
[45] Date of Patent: Sep. 22, 1998

[54] ROTARY TRANSFORMER OF A HEAD DRUM ASSEMBLY FOR A VIDEO CASSETTE

[75] Inventor: Hyeon-Sub Hwang, Seoul, Rep. of Korea

[73] Assignee: Daewoo Electronics Co., Ltd., Rep. of Korea

[21] Appl. No.: 775,081

[22] Filed: Dec. 30, 1996

[30] Foreign Application Priority Data

Dec. 29, 1995 [KR] Rep. of Korea ............ 1995-51405

[51] Int. Cl.[6] .................................................. G11B 5/52
[52] U.S. Cl. ........................................... 360/108; 360/64
[58] Field of Search ............................. 360/64, 108, 123, 360/124; 336/120, 122, 123

[56] References Cited

U.S. PATENT DOCUMENTS 4,914,537  4/1990  Ota .......................................... 360/108
5,276,565  1/1994  Higashiyama et al. ............. 360/108 X Primary Examiner—Paul W. Huber

[57] ABSTRACT

A rotary of a head drum assembly for a VCR in which the structure thereof is simple, thereby facilitating the manufacture and assembling thereof. Stator and rotor bodies of the rotary transformer are annular disc-shaped. The stator body has one stator channel formed on its upper surface, and the rotor body also has one rotor channel formed on its lower surface. Two stator coils are wound and attached in the stator channel, and two rotor coils wound and attached in the rotor channel. The rotor coils are electrically connected to two magnetic heads mounted on an upper drum of the head drum assembly, and the stator coils are electrically connected to a video signal processing system. A head switcher is provided so that video signals read by the magnetic heads can be alternately transferred to two preamplifiers of the video signal processing system.

6 Claims, 6 Drawing Sheets

ROTARY TRANSFORMER OF A HEAD DRUM ASSEMBLY FOR A VIDEO CASSETTE

BACKGROUND OF THE INVENTION

1. Field of the Invention

The present invention relates to a head drum assembly for a video cassette recorder, and more particularly to a rotary transformer of a head drum assembly for a video cassette recorder.

2. Description of the Prior Art

Generally, a video cassette recorder (hereinafter, referred to as a VCR) is a device for recording and reproducing video and audio signals onto and from a magnetic tape running by a tape running system of the VCR, Such a VCR records and reproduces the video signals as its magnetic heads make contact with the magnetic tape while a head drum of the VCR is rotating. The magnetic heads are electrically connected to a signal processing system of the VCR through a rotary transformer so that the video signals are transferred from the heads to the signal processing system and vice versa.

FIG. 1 schematically shows a conventional head drum assembly of a VCR.

Referring to FIGS. 1, the head drum assembly includes a lower drum 10 mounted on a base plate (not shown) of the VCR, and an upper drum 20 on which magnetic heads 22 are mounted. A motor 30 is mounted on lower drum 10 below lower drum 10.

Motor 30 has a stator 30A and a rotor 30B, and rotor 30B is rotated in magnetic conjunction with stator 30A if a current is applied to stator 30A. Upper drum 10 is fixed to an upper portion of a shaft 32 by a flange 24, and rotor 30B is fixed to a lower portion of shaft 32. Shaft 32 is inserted into a bearing housing integrally formed with lower drum 10. So, if a current is applied to motor 30, rotor 30B of motor 30 is rotated and shaft 32 and upper drum 30 are rotated together.

In general, two magnetic heads 22 are mounted on upper drum 20. Magnetic heads 22, as shown in FIG. 1, are mounted on upper drum 20 such that they are circumferentially spaced apart from each other by 180 degree.

FIGS. 2 and 3 schematically shows the rotary transformer of FIG. 1.

Referring to FIGS. 1 through 3, a rotary transformer 50 is provided to transfer the video signals to and from magnetic heads 22 at a position between lower and upper drums 10 and 20. Rotary transformer 50 comprises a transformer stator 60 and a rotor 70, which are respectively mounted on lower and upper drums 10 and 20.

Transformer stator 60 comprises a stator body 60A and calls 64 (hereinafter, referred to as stator coils), and is electrically connected to a recording and reproducing signal processing system (not shown) of the VCR through stator coils 64.

Transformer rotor 70 comprises a rotor body 70A, and coils 74 (hereinafter, referred to as rotor coils) wound on rotor body 70A. Rotor body 70A is mounted on upper drum 20 such that it is spaced apart from stator body 60A by a minute gap, and is electrically connected to magnetic heads 22 by rotor coils 74. During the recording and reproducing operation of the VCR, transformer rotor 70 rotates together with upper drum 20.

Stator body 60A has an annular disc-shape, on the upper surface of which two channels 62 (hereinafter, referred to as stator channels) are concentrically disposed. Stator coils 64 are respectively wound and bonded in stator channels 62 and electrically connected to the video signal processing system (not shown) of the VCR. As shown in FIG. 2, two stator coils 64 are electrically connected to the video signal processing system through two wiring grooves 66 radially formed on the upper surface of stator body 60A.

Rotor body 70A also has an annular disc-shape and has two channels 72 (hereinafter, referred to as rotor channels) concentrically disposed on the lower surface thereof at radial positions opposite to the radial positions of stator channels 62. Rotor coils 74 are respectively wound and bonded in, rotor channels 72 and are electrically connected to corresponding magnetic heads 22 by soldering or the like. As shown in FIG. 2, two rotor coils 74 are electrically connected to magnetic beads through two wiring grooves 76 radially formed on the lower surface of rotor body 70A.

Hereinafter, the signal recording and reproducing operation of the conventional head drum assembly will be explained.

In order to record the video signals onto the magnetic tape of the VCR, the recording signal processing system (not shown) transfers video signals to the stator coils 64 in the form of current magnitude changes. As the current magnitudes of the stator coils 64 are changed, electromotive forces are generated in the corresponding rotor coils 74. Namely, whenever the current magitudes of stator coils 64 are changed, the magnetic fluxes flowing in the directions perpendicular to the cross sections of rotor coils 74 are changed, thereby generating electromotive forces in rotor coils 74 so that the video signals are transferred from transformer stator 60 to transformer rotor 70. The signals transferred to transformer rotor 70 are transferred to magnetic heads 22 electrically connected to rotor coils 74. The signals sent to magnetic heads 22 are recorded on the magnetic tape of the VCR when heads 22 make contact with the magnetic tape while upper drum 20 is rotating.

In order to reproduce the video signals from the magnetic tape, magnetic heads 22 mounted on upper drum 20 make contact with the magnetic tape and reads the video signals from the magnetic tape in sync with the rotation of upper drum 30. The signals change magnitudes of the currents flowing through rotor coils 74. The current magnitude changes of rotor coils 70 generate electromotive forces in stator coils 64, and thus change the current magnitudes of stator coils 64. As a result, the signals read by magnetic heads 22 are transferred through rotary transformer 50 to the reproducing signal processing system. The signal processing system reproduces video signals from magnetic heads 22 by using the current magnitude changes.

In the conventional head drum assembly, however, it is difficult to form the channels on the surfaces of the stator and the rotor bodies because the spaced distances between the channels are very small, and it is also difficult to constantly maintain the gap between the channels. Accordingly, the manufacturing and assembling costs of the head drum assembly are increased.

SUMMARY OF THE INVENTION

Therefore, it is an object of the present invention to provide a rotary transformer in which manufacturing and assembling coasts thereof can be reduced due to a simple structure thereof, and which can prevent cross-talks of video signals, which are unintended effects of magnetic fields.

In order to achieve the object of the present invention, there is provided a rotary transformer of a head drum assembly for a VCR which comprises a transformer stator having a stator body which is mounted on a lower drum of the head drum assembly and has one stator channel formed on a surface thereof, wherein two stator coils are wound and attached in the stator channel and are electrically connected to a video signal processing system of the VCR, and a transformer rotor having a rotor body which is mounted on an upper drum of the head drum assembly and has one rotor channel formed on a surface thereof, wherein two rotor coils are wound and attached in the rotor channel, each of the coils being electrically connected to two magnetic heads mounted on the upper drum.

The stator and rotor bodies are substantially annular disc-shaped, the stator and rotor channels being circumferentially formed respectively on upper and lower surfaces of the stator and rotor bodies, the stator and rotor channels being opposite to each other so that a video signal is transferred to and from one of stator coils and the corresponding rotor coil.

Wiring grooves for electrically connecting the stator and rotor coils to the video signal processing system and the magnetic heads are respectively formed on the surfaces on which the stator and rotor channel are formed, the wiring grooves being corresponding to the stator and rotor coils respectively.

The stator coils are switched by a switching device of the video signal processing system and alternately connected to preamplifiers of the video signal processing system.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENT

Hereinafter, a preferred embodiment of the present invention will be described in detail with reference to the accompanying drawings.

Figure 1:
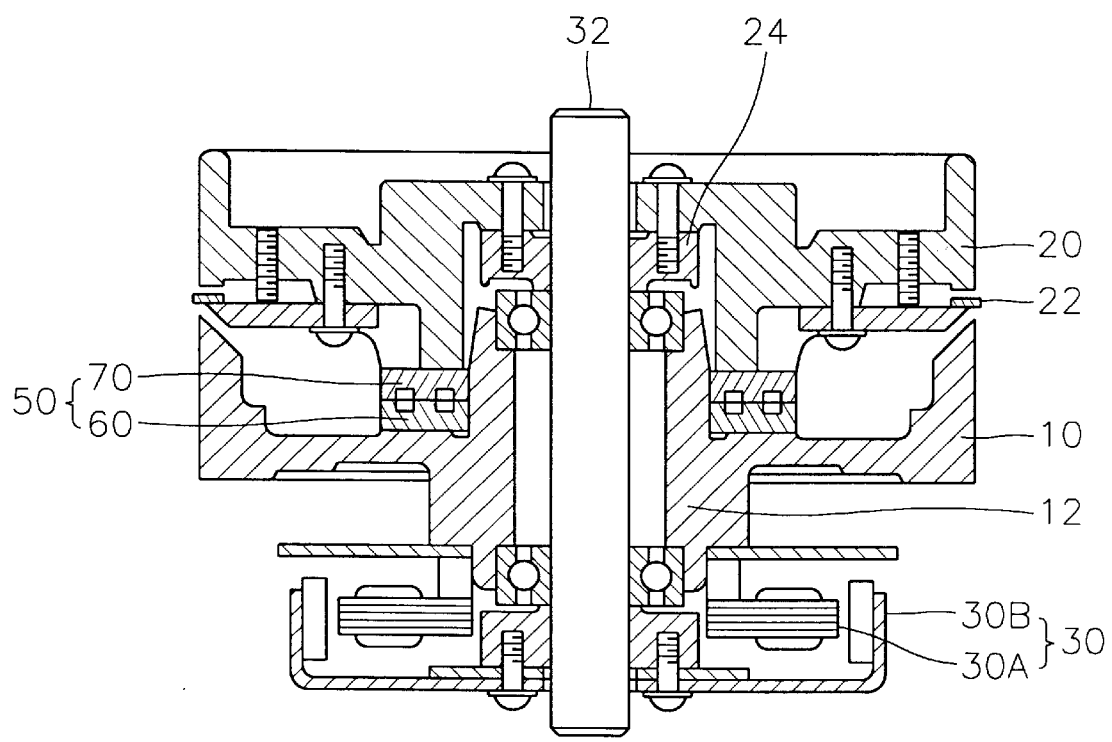
FIG. 1 is a cross sectional view for showing a conventional head drum assembly of the VCR.
Figure 2:
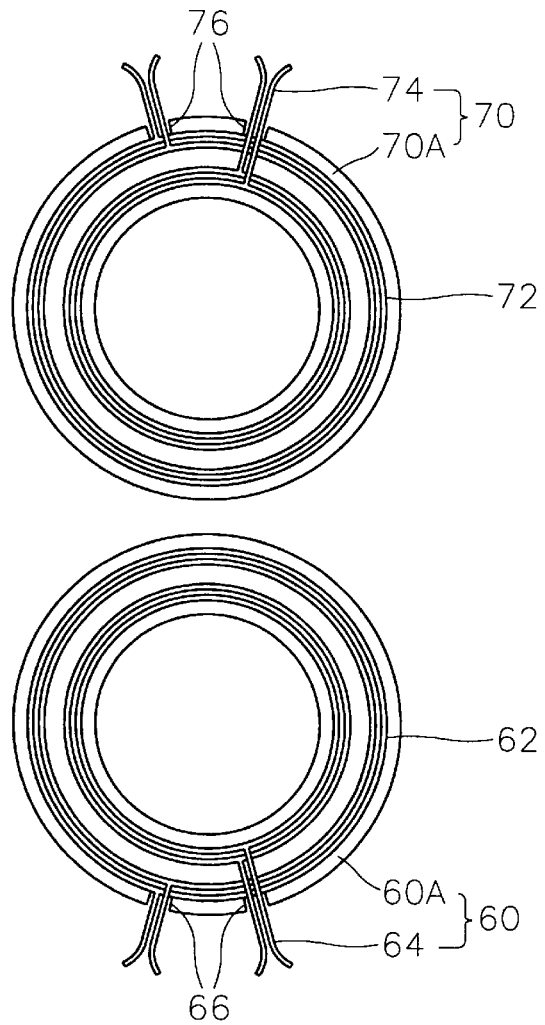
FIG. 2 is an enlarged view for showing a rotary transformer employed in the head drum assembly of FIG. 1.
Figure 3:
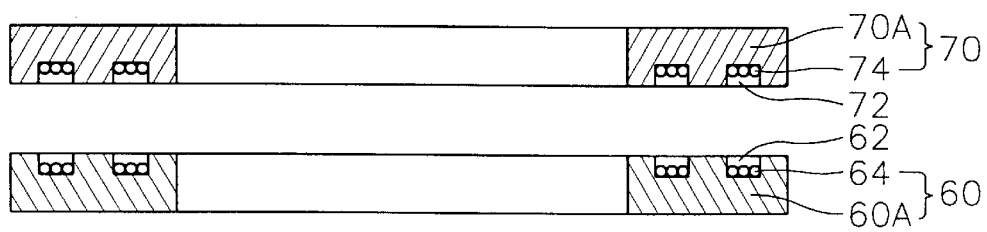
FIG. 3 is a longitudinal sectional view for showing the rotary transformer of FIG. 2.

FIG. 3 shows a head drum assembly in which a rotary transformer according to the present invention is mounted.

Figure 4:
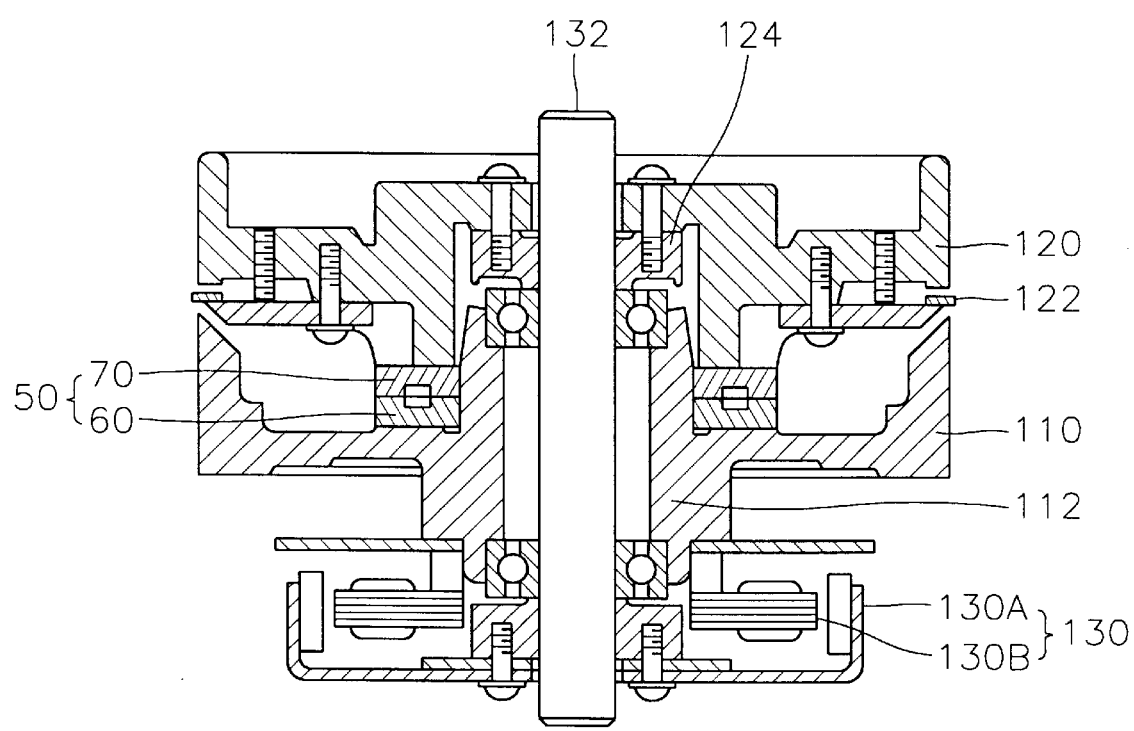
FIG. 4 is a cross sectional view for showing a head drum assembly of the VCR employing a rotary transformer according to an embodiment of the present invention.

Referring to FIG. 4, the head drum assembly includes a lower drum 110 mounted on a base plate (not shown) of the VCR, and an upper drum 120 on which magnetic head 122, which record and reproduce video signals onto and from a magnetic tape 105, are mounted. A motor 130 is mounted on lower drum 110 therebelow.

Motor 130 has a stator 130A and a rotor 130B, and rotor 130B is rotated in magnetic conjunction with stator 130A if a current is applied to stator 130A. Upper drum 120 is fixed to an upper portion of a shaft 132 by a flange 124, and rotor 130B is fixed to a lower portion of shaft 132. Shaft 132 is inserted into a bearing housing which is integrally formed with lower drum 110. So, shaft 132 is rotated in sync with the rotation of motor rotor 130B. Namely, if a current is applied to motor 130, rotor 130B of motor 130 is rotated, and hence shaft 132 and upper drum 130 are rotated together.

Two magnetic heads 122 are mounted on upper drum 20. Magnetic heads 122, as shown in FIG. 4, are mounted on upper drum 120 such that they are circumferentially spaced apart from each other by 180 degree.

A rotary transformer 150 is provided at a position between lower and upper drums 110 and 120 so that the video signals are transferred to and from magnetic heads 122 and a video signal processing system. Rotary transformer 150 comprises a transformer stator 160 and a transformer rotor 170, which are respectively mounted on lower and upper drums 110 and 120 of the head drum assembly. Transformer stator 160 comprises a stator body 160A and coils 164 (hreinafter, referred to as stator coils), and is electrically connected through stator coils 164 to the video signal processing system of the VCR. Transformer rotor 170 comprises a rotor body 170A and coils 174 (hereinafter, referred to as rotor coils) wound on rotor body 170A. Transformer rotor 170 is electrically connected through rotor coils 174 to magnetic heads 122 mounted on upper drum 120.

Figure 5:
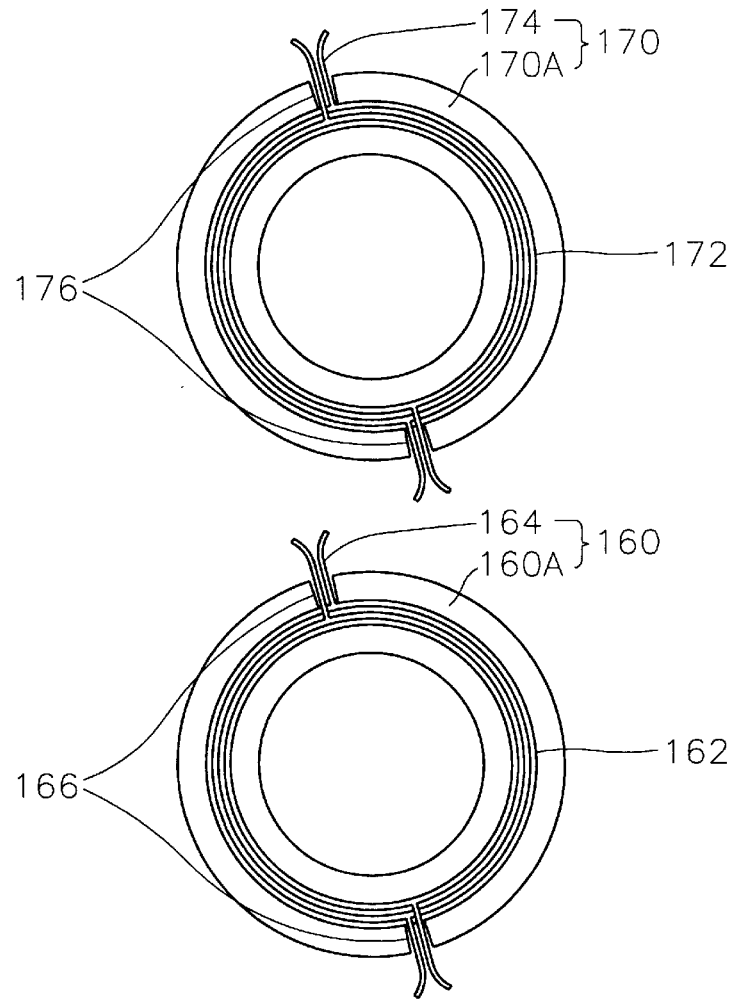
FIG. 5 is an enlarged view for showing the rotary transformer of FIG. 4.
Figure 6:
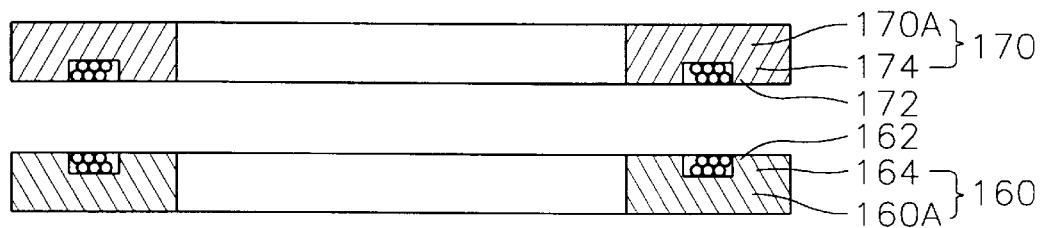
FIG. 6 is a longitudinal sectional view for showing the rotary transformer of FIG. 4.

FIG. 5 is an enlarged view for showing the rotary transformer of FIG. 4, and FIG. 6 is a longitudinal sectional view for showing cross sections of the rotary transformer of FIG. 4.

Referring to FIGS. 5 and 6, stator body 160A has an annular disc-shape and has a channel 162 (hereinafter, referred to stator channel) which is circumferentially formed on the upper surface thereof. Two stator coils 164 are wound and bonded in stator channel 162 and electrically connected to the signal processing system of the VCR. Stator body 160A is mounted on lower drum 110. As shown in FIG. 5, two stator coils 162 are electrically connected to the signal processing system through two wiring grooves 166 radially formed on the upper surface of stator body 160A.

Rotor body 170A also has an annular disc-shape and has a channel 172 (hereinafter, referred to rotor channel) which is circumferentially formed on the lower surface thereof. Rotor channel 172 is formed at a radial position opposite to stator channel 162. Two rotor coils 174 are wound and bonded in rotor channel 172 and electrically connected to corresponding magnetic heads 122 by soldering or the like. Rotor body 170A is mounted on upper drum 120 such that it is spaced apart from stator body 160A by a minute gap, and is electrically connected to magnetic heads 122 through rotor coils 174. During the recording and reproducing operation of the VCR, transformer rotor 170 rotates together with upper drum 120. As shown in FIG. 5, two rotor coils 162 are electrically connected to the signal processing system through two wiring grooves 166 radially formed on the lower surface of stator body 160A.

Figure 7:
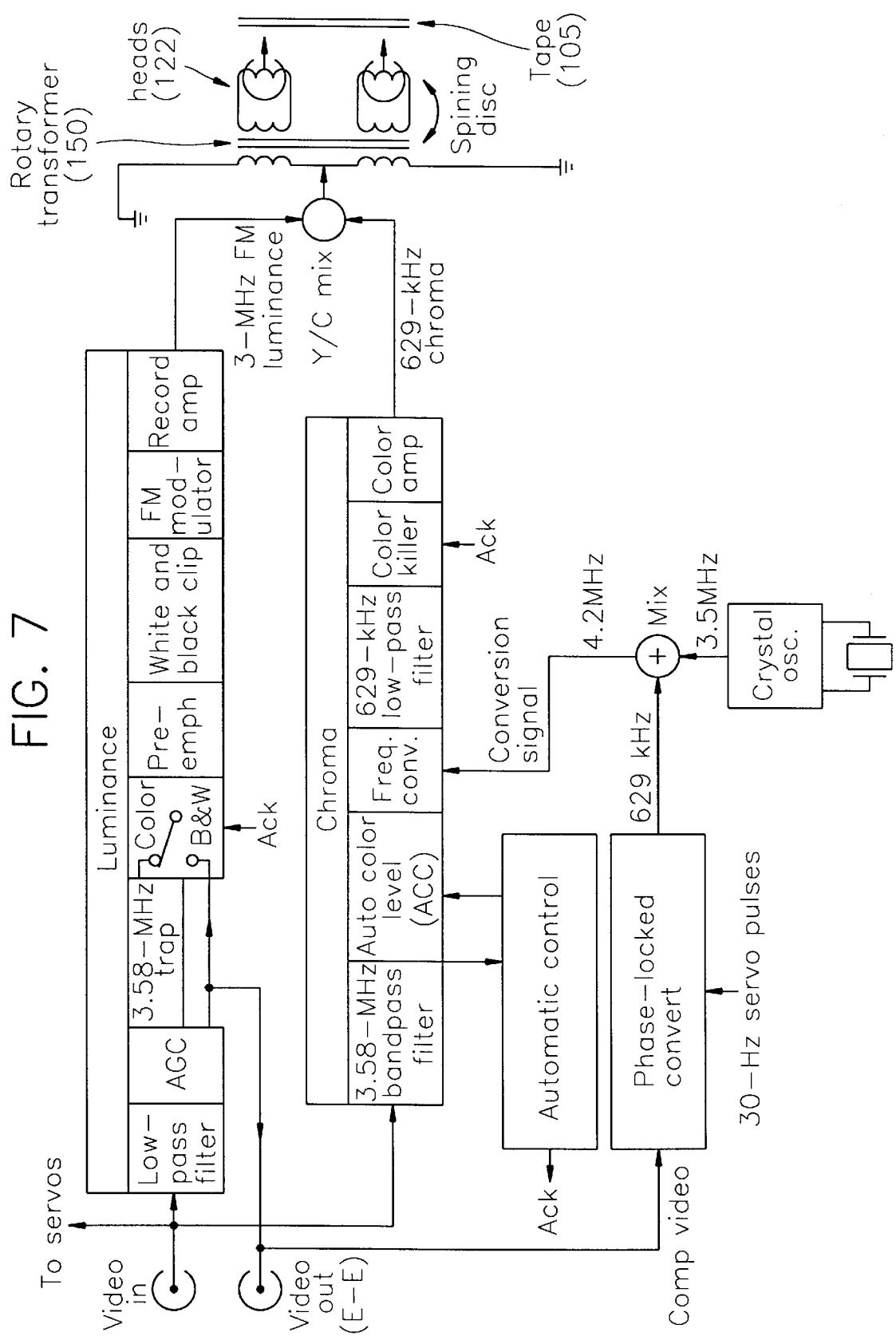
FIG. 7 is a view for explaining the electrical connection of the rotary transformer of FIG. 4 during recording mode.
Figure 8:
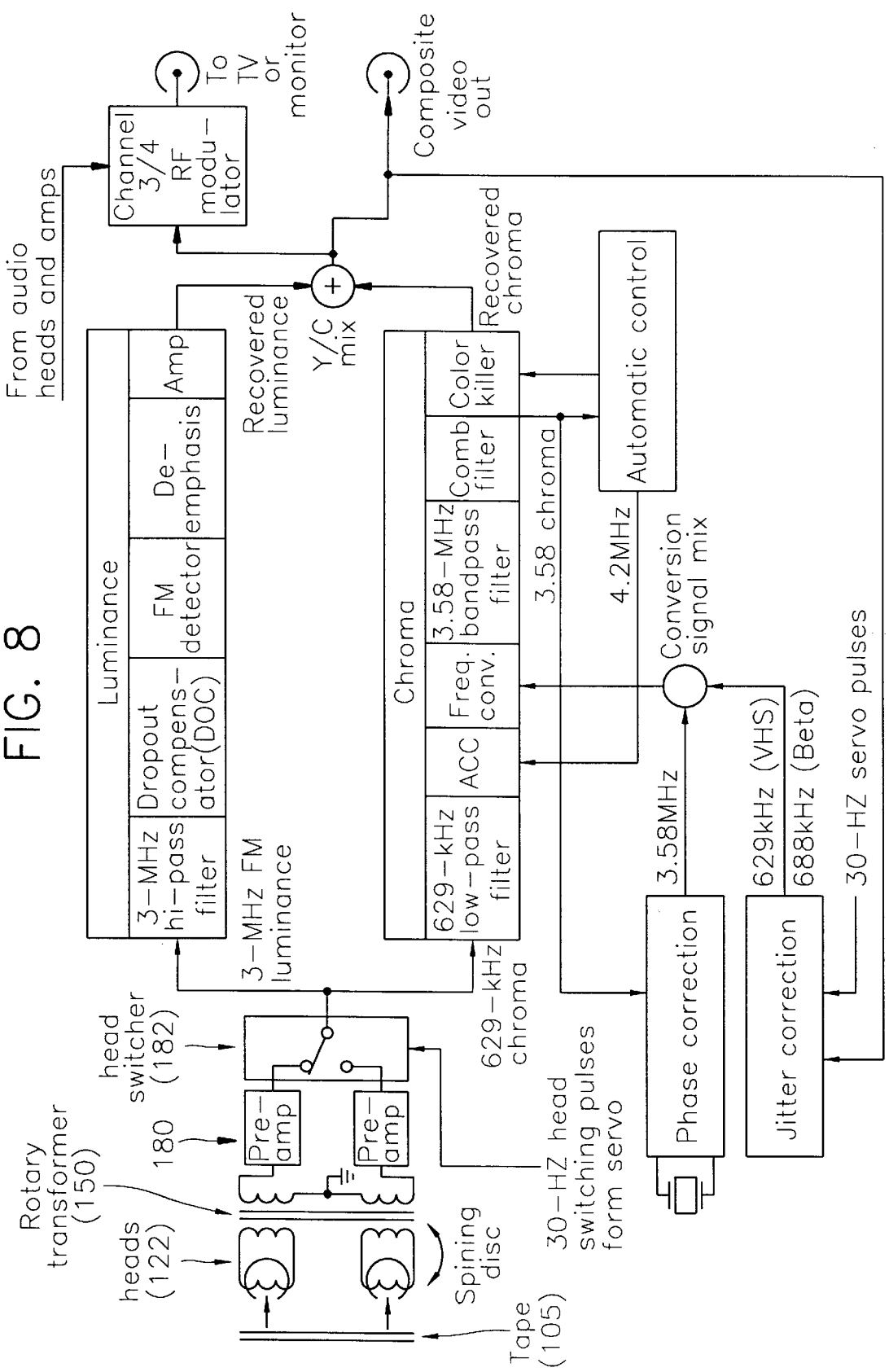
FIG. 8 is a view for explaining the electrical connection of the rotary transformer of FIG. 4 during reproducing mode.

Hereinafter, signal flows during recording and reproducing modes are explained. FIGS. 7 and 8 respectively shows electrical connections of the rotary transformer according to the present invention during recording and reproducing modes of the VCR.

Referring to FIGS. 4, 5, and 7, in the reproducing mode of the VCR, a composite video signal inputted through a video input port is divided into two types of signals, i.e., luminance and chroma signals. The luminance signal is converted to FM with a center frequency about 3 MHz and a deviation of ±1 MHz. The chroma signal is down-converted from 3.58 MHz to 629 kHz. The two signals are then recombined in a Y/C mixer. A more detailed description of what takes place in the video signal record processing system follows.

Referring to FIG. 7, the demodulated composite video signal first goes to a low-pass filter, which attenuates the 3.58-MHz chroma signal. Leaving the filter, the color signal is further attenuated by a 3.58-MHz trap and the desired luminance signal is controlled by AGC action. From here the luminance signal goes to a preemph, which improves the signal-to-noise ratio of the highest video frequencies. A white-and-black clip limits the overshoot for white and dark areas of a picture, which would otherwise become blurred. An FM modulator then converts the amplitude-modulated video signal to FM with a deviation corresponding to the amplitude of the luminance signal. From here the luminance signal goes through several stages of amplification to obtain the power needed to magnetically saturate the magnetic tape. The processed luminance signal is combined with the chroma signal in the Y/C mixer.

The chroma signal is separated from the luminance signal with a bandpass filter. The chroma signal then goes through a leveling process in an automatic color control section. The next step is frequency conversion, where the 3.58-MHz signal and 629-kHz signals are combined to produce a 4.2-MHz signal. After the conversion, the chroma signal goes to a 600-kHz low-pass filter, which permits only the down-converted 629-kHz signal to get through. After passing through an automatic color killer, the chroma signal is then amplified by color amplifiers. From here the amplified chroma signal is sent to the Y/C mixer. The processed chroma signal is combined with the luminance signal in the Y/C mixer.

The composite video signals combined with luminance and chroma signals are transferred to stator coils 164. The signals change the magnitudes of the currents flowing through stator coils 164. The current magnitude changes then generate electromotive forces on rotor coils 174 corresponding to stator coils 164. Namely, whenever the current magnitudes of stator coils 64 are changed, the magnetic fluxes flowing in the directions perpendicular to the cross sections of rotor coils 174 are changed, thereby generating electromotive forces in rotor coils 174 so that the video signals are transferred from transformer stator 160 to transformer rotor 170. The signals transferred to transformer rotor 170 are sent to magnetic heads 122 electrically connected to rotor coils 174. The signals sent to magnetic heads 122 are recorded onto the magnetic tape of the VCR while heads 122 are in contact with the running magnetic tape in sync with the rotation of upper drum 120.

Referring to FIGS. 4 and 5, in the reproducing mode of the VCR, two magnetic heads 122 mounted on upper drum 120 alternately trace recording tracks of magnetic tape 105 and read video signals from magnetic tape 105, while upper drum 120 is rotating. The video signals change the magnitudes of the currents flowing along rotor coils 174. The current magnitude changes then generate electromotive forces in stator coils 164 corresponding to rotor coils 174.

The current magnitudes of stator coils 164 are changed by the electromotive forces. The current magnitudes changes of stator coils 164 are then transferred to two preamplifiers 180 which are respectively connected to stator coils 164.

Referring to FIG. 8, since the signals are overlapped for a small period of time, they are alternately switched by a bead switcher 182 and read as a continuous signal. The composite video signals read by two magnetic heads 122 are transferred to luminance and chroma signal processing circuits without affecting each other. The composite video signal is divided into luminance and chroma signals. The luminance signal is converted into FM. The chroma signal is down-converted to 629 kHz and then restored to 3.58 MHz. The signals are recombined in a Y/C mixer, and then are sent to an RF modulator. The combined signs is fed to the antenna input of a TV receiver or monitor. A more detailed description of what takes place in the video signal reproduce processing system follows.

Weak composite video signals (less than 1 mV), which are recovered from magnetic tape 105 by two magnetic heads 122 and are transferred to the signal processing system via rotary transformer 150, are boosted by two high-gain preamplifiers. The boosted signals go to head switcher 182, which switches alternately from one head to the other in sync with the rotation of upper drum 120 and the travelling of tape 105. After leaving the switcher, the luminance and chroma signals divide, each going its separate way.

The 3-MHz luminance signal first goes through a high-pass filter, through which every luminance signal passes while attenuating the chroma signal is attenuated. From here, the luminance signal goes to a dropout compensator, and then is demodulated in an FM detector. From here the signal goes to a deemphasis, and is restored to normal by attenuating the highest frequencies. After receiving additional amplification, the recovered luminance signal is combined with the chroma signal and routed to the RF modulator. The signal is then fed to the video input of a TV or monitor via an output port of the VCR.

The chroma signal fed to a low-pass filter via rotary transformer 105 from magnetic heads 122 is separated from the luminance signal and then fed to an ACC color leveling stage. A frequency converter then reconverts it back into a 3.58-MHz chroma signal. A bandpass filter permits only the chroma signal to get through. Additional filtering is provided by a comb filter. After passing through an automatic color killer, the chroma signal is combined with the luminance signal in the Y/C mixer, from which it is routed to an RF modulator, and then to the TV or monitor via an output port of the VCR.

In the rotary transformer according to the present invention, the shape and structure of the transformer rotor is simple, so it is easy to manufacture the rotary transformer. Further, the transformer rotor can be easily mounted on the upper drum, and the gap between the rotors and the transformer stator can be accurately maintained. Further the arrangements of the stator channels and the transformer rotor, and the size of the gap between the rotors and the transformer stator, can be easily altered.

In addition, according to the present invention, cross-talks which cause noises in video signals of a VCR can be prevented by forming magnetic conjunctions between rotor coils and the corresponding stator coils by the connecting members.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A rotary transformer of a head drum assembly for a video cassette recorder comprising:

a transformer stator having a stator body which is mounted on a lower drum of the head drum assembly and has one stator channel formed on a surface thereof, and two stator coils wound and attached in the stator channel and electrically connected to a video signal processing system of the VCR; and a transformer rotor having a rotor body which is mounted on an upper drum of the head drum assembly and has one rotor channel formed on a surface thereof, and two rotor coils wound and attached in the rotor channel, each of the rotor coils being electrically connected to two magnetic heads mounted on the upper drum.

2. A rotary transformer of a head drum assembly for a video cassette recorder according to claim 1, wherein the stator and rotor bodies are substantially annular disc-shaped, the stator and rotor channels being circumferentially formed respectively on upper and lower surfaces of the stator and rotor bodies, the stator and rotor channels being opposite to each other so that a video signal is transferred to and from one of stator coils and the corresponding rotor coil.

3. A rotary transformer of a head drum assembly for a video cassette recorder according to claim 1, wherein wiring grooves for electrically connecting the stator and rotor coils to the video signal processing system and the magnetic heads are respectively formed on the surfaces on which the stator and rotor channels are formed, the wiring grooves being corresponding to the stator and rotor coils respectively.

4. A rotary transformer of a head drum assembly for a video cassette recorder according to claim 1, wherein the stator coils are switched by a switching device of the video signal processing system and alternately connected to preamplifiers of the video signal processing system.

5. A rotary transformer of a head drum assembly for a video cassette recorder according to claim 1, wherein the stator and rotor bodies are substantially annular disc-shaped, the stator and rotor channels being circumferentially formed respectively on upper and lower surfaces of the stator and rotor bodies, the stator and rotor channels being opposite to each other so that a video signal is transferred to and from one of the stator coils and the corresponding rotor coil, and wiring grooves for electrically connecting the stator and rotor coils to the video signal processing system and the magnetic heads are respectively formed on the surfaces on which the stator and rotor channels are formed, the wiring grooves being corresponding to the stator and rotor coils respectively.

6. A rotary transformer of a head drum assembly for a video cassette recorder according to claim 5, wherein the stator coils are switched by a switching device of the video signal processing system and alternately connected to preamplifiers of the video signal processing system.

* * * * *